United States Patent [19]

Lazzari

[11] Patent Number: 4,684,438
[45] Date of Patent: Aug. 4, 1987

[54] PROCESS FOR PRODUCING A COIL FOR A MAGNETIC RECORDING HEAD

[75] Inventor: Jean-Pierre Lazzari, Corenc, France

[73] Assignee: Commissariat a l'Energie Atomique, Corenc, France

[21] Appl. No.: 696,485

[22] Filed: Jan. 30, 1985

[30] Foreign Application Priority Data

Feb. 3, 1984 [FR] France .................. 84 01878

[51] Int. Cl.⁴ ........................................ G11B 5/17
[52] U.S. Cl. ................................ 156/649; 29/603; 360/122; 360/123; 427/116
[58] Field of Search ............ 427/96, 99, 88, 91, 427/116; 156/643, 649, 653, 657, 659.1; 360/122, 123, 125; 29/579, 580, 603

[56] References Cited

U.S. PATENT DOCUMENTS

| 1,820,240 | 8/1931 | Michell | 427/116 |
| 3,685,144 | 8/1972 | Trimble | 29/603 |
| 4,099,305 | 7/1978 | Cho et al. | 156/649 X |
| 4,458,279 | 7/1984 | Katz | 360/123 |
| 4,539,616 | 9/1985 | Yuito et al. | 360/125 |

FOREIGN PATENT DOCUMENTS

| 0013782 | 8/1980 | European Pat. Off. | |
| 1564820 | 5/1970 | Fed. Rep. of Germany. | |
| 2510290 | 1/1983 | France. | |
| 56-54629 | 5/1981 | Japan | 360/122 |
| 59-214282 | 12/1984 | Japan | 156/649 |

OTHER PUBLICATIONS

Patents Abstracts of Japan, vol. 6, No. 182 (E-131)[1060], Sep. 18, 1982, p. 15E131; & JP-A-57 95609 (Kangiyou Denki Kiki K.K.) 6-14-1982.
Patents Abstracts of Japan, vol. 5, No. 107 (P-70)[779], Jul. 11, 1981; & JP-A-56 51015 (Suwa Seikosha K.K.) 5-08-1981.
Patents Abstracts of Japan, vol. 4, No. 78 (P-14)[560], Jun. 1980, p. 42P14; & JP-A-55 42352 (Suwa Seikosha K.K.) 3-25-1980.
Patents Abstracts of Japan, vol. 5, No. 118 (P-73)[790], Jul. 30, 1981; & JP-A-56 58124 (Fujitsu K.K.) 5-21-1981.
Patents Abstracts of Japan, vol. 6, No. 82(P-116)[960], May 20, 1982; & JP-A-57 18014 (Fujitsu K.K.) 1-2-9-1982.
Patents Abstracts of Japan, vol. 5, No. 150 (P-81)[822], Sep. 22, 1981; & JP-A-56 83824 (Fujitsu K.K.) 7-08-1981.
IEEE Transactions on Magnetics, vol. MAG-17, No. 4, Jul. 1981, pp. 1383-1386, IEEE, New York, US; A. M. Gindi et al: "Design Considerations for the DASTEK 4830 Disk Drive", p. 1384.
Journal of Applied Physics, vol. 53, No. 3, Part II, Mar. 1982, pp. 2611-2613, American Institute of Physics, New York US, Y. Noro et al.: "Fabrication of a Multitrack, Thin-Film Head", p. 2611.
Review of the Electrical Communication Laboratories, vol. 30, No. 3, 1982, pp. 459-466, Tokyo, JP; T. Nakanishi et al: "Floating Thin Film Magnetic Head", p. 460.

Primary Examiner—Donald E. Czaja
Assistant Examiner—Ramon R. Hoch
Attorney, Agent, or Firm—Oblon, Fisher, Spivak, McClelland, & Maier

[57] ABSTRACT

A process for producing a coil for a magnetic recording head and the coil obtained by this process. An insulating film which covers a support is etched in order to give it the shape of a first spiral. The support is then etched by using the insulating film as a mask, forming a groove in the form of a second spiral, which is complementary to the first spiral. A thin metal layer is then deposited on the insulating film used as the mask and simultaneously on the bottom of the etched groove, producing two conductors in the form of complementary spirals which are located in two different planes.

4 Claims, 9 Drawing Figures

PROCESS FOR PRODUCING A COIL FOR A MAGNETIC RECORDING HEAD

BACKGROUND OF THE INVENTION

The present invention relates to a process for producing a coil for a magnetic recording head and to a coil obtained by this process. It is used in the field of magnetic recording, disk memories, tape unreeling devices, videoscopes, etc.

A magnetic recording head comprises an open magnetic circuit having an air gap and a coil surrounding a leg of the magnetic circuit. On writing, the passage of a current through the coil produces a leakage field at the air gap permitting the writing of information in a recording layer in the vicinity thereof. On reading, a magnetic flux variation from the recording layer induces, at the terminals of the coil, a potential difference constituting a reading signal.

A magnetic recording head coil generally comprises one or more conductive spirals arranged in different planes. In order to produce such a coil, a first conductive spiral is formed by deposition and then etching of a metal layer, followed by the deposition of an insulating layer on the assembly. This process is repeated for forming a second spiral on the insulating layer. The etching operations take place through masks and the two masks used are arranged in such a way that the two spirals are displaced from one another.

Such a procedure is more particularly described in the article by Y. NORO entitled "Fabrication of a multitrack thin-film head" published in the Journal of Applied Physics, Vol. 53, 3, March 1982, pp. 2611-2613.

Although such processes are satisfactory in certain respects, they are difficult to perform, particularly due to the double masking necessary for defining the coil. Thus, it is necessary to position the second mask with considerable accuracy with respect to the first, or more precisely with respect to the first spiral obtained.

SUMMARY OF THE INVENTION

The object of the present invention is to obviate this disadvantage by proposing a process only involving a single masking, but which still makes it possible to obtain two windings or coils.

According to the invention, this objective is achieved by a process firstly comprising a conventional phase in the technology of depositing thin films, followed by a second original phase essentially consisting of depositing a conductive coating at the bottom of a spiral groove and simultaneously on the material between two arms of the spiral. Thus, two conductive spirals are simultaneously obtained in two different planes, the only masking involved being that making it possible to obtain the groove. Thus, there is a self-alignment of the two conductive tapes. Moreover, the two spirals obtained are strictly complementary in that, viewed perpendicularly to their plane, the two spirals cover the complete plane. In the prior art, there is an overlap of the two spirals, which leads to breakdown risks.

More specifically, the present invention relates to a process for producing a coil for a magnetic recording head in which an insulating support is covered by a thin insulating film, the insulating film is etched by photolithography in order to give it the shape of a first spiral with, at the centre, a wider area defining a future inner contact element and, on the periphery, an area defining a future outer contact element, the support is etched by using the insulating film as a mask, which leads to a groove in the form of a second spiral, which is complementary to the first, wherein a thin metal layer is deposited on the assembly, i.e. on the insulating film used as the mask and simultaneously at the bottom of the etched groove, which gives rise to two conductors in the form of complementary spirals and located in two different planes, said spirals terminating by an inner contact element and an outer contact element, the thin metal layer has a small thickness compared with the depth of the groove, a photosensitive resin is deposited on the assembly, followed by the removal of the resin outside the area of the spiral, and by etching, the superfluous metal layer deposited on the insulating film outside these spirals is removed, the resin is removed and an electrical connection is made between the inner contact element of a spiral and the outer contact element of the other spiral.

The invention also relates to a coil obtained by this process. On an insulating support, the coil comprises two spiral conductors arranged in two different planes, namely a lower plane and an upper plane. The two spirals are rigorously complementary to one another, the coil arranged in the lower plane being positioned at the bottom of a groove etched in the support.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
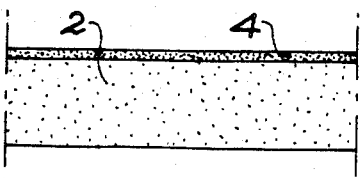
FIGS. 1, 2, 3, 4, 5, 6 and 7, in section, the main stages of the process according to the invention.

FIG. 1 shows a support 2 formed from an electrically insulating material, such as e.g. glass, silica or an organic layer. This support is covered with a thin film 4 with a thickness equal to or less than 1 micron of an electrically insulating material and which can e.g. be an organic layer of silica or silicon nitride. This film 4 must be selectively etchable with respect to support 2, in accordance with known photolithographic methods.

Figure 2:
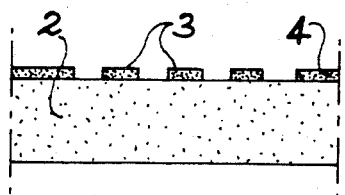

FIG. 2 illustrates the result of the etching of film 4. The material left behind delineates a spiral 3 with widened areas in the centre and on the periphery, as can best be seen in FIG. 8.

Figure 3:
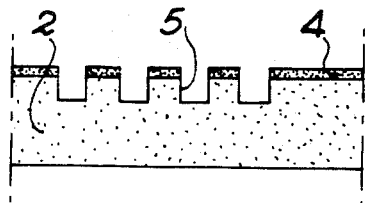

FIG. 3 illustrates the etching of a groove 5 obtained by using film 4 as a mask.

Figure 4:
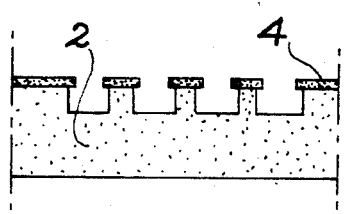

FIG. 4 shows an overetching of support 2 which, as it does not touch film 4, ensures that the latter overhangs each vertical wall of the groove made in support 2.

Figure 5:
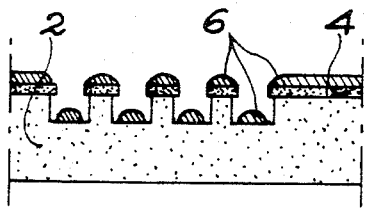

FIG. 5 shows the deposition of an electrically conductive layer 6, which can be of copper or any other good electrically conductive material. This deposit preferably takes place under vacuum. It can be seen that the copper layer is deposited at the bottom of groove 5 and what is left of film 4, without covering the vertical sides of the groove. These deposits consequently define two complementary spirals without any short-circuit between them. These two spirals are in two different planes, the upper plane of film 4 and the bottom of the groove etched in support 2.

Figure 6:
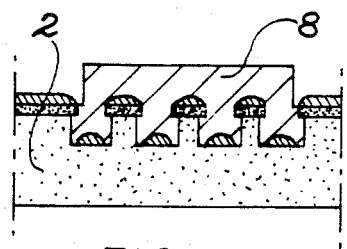

FIG. 6 shows a photosensitive resin reservation 48 which, by etching, makes it possible to eliminate the superfluous portions of the deposit of layer 6 on the plane of film 4.

Figure 7:
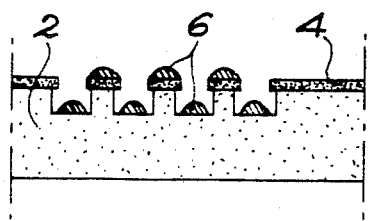

FIG. 7 illustrates the final result.

Figure 8:
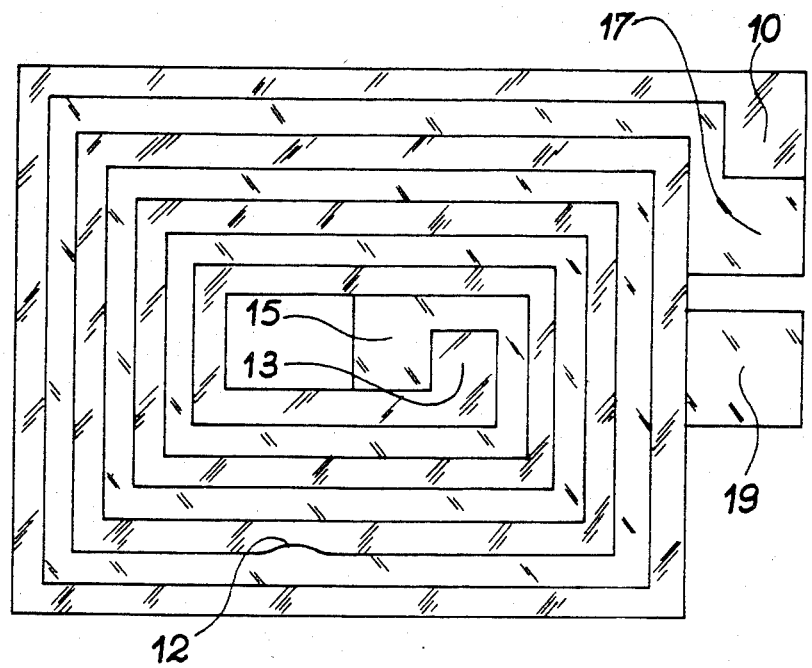
FIG. 8 the coil shown perpendicularly to its plane.

FIG. 8 illustrates the shape of the coil, viewed perpendicularly to its plane. The portion etched in support 2 is represented by the spiral starting from the wider area 10 and finishing in the wider area 13. The spiral obtained on the upper plane of film 4 starts in area 17 and ends in area 15. In order to form a double spiral with continuity of the winding in the same direction, it is merely necessary to connect area 13 to area 17 by known methods. The input of the coil will then be the contact element 10 and its output will be the contact element 15, which can be more easily connected to a contact element 19.

FIG. 8 shows that the arms of the two spirals are strictly complementary without loss of space, which is obtained whilst still guaranteeing an excellent insulation between each conductor. For example, if it is found that there is an irregularity 12 in the formation of the groove, this irregularity will in no way modify the complementary nature of the two conductive spirals, one of which is wider than the other, but in no case can they encroach on one another. A precise etching can be obtained by choosing insulating materials which can be easily etched, whilst the metal of layer 6 can only be finally etched with difficulty. According to the invention, the metal is only etched in order to pass round the contact elements 17, 19 or 15, which does not require high accuracy.

For all these reasons, a hard material will be used for film 4, such as silica or silicon nitride. Moreover, to obviate risks of short-circuiting between the two spirals, the thickness of the metal deposit 6 will be limited to approximately ⅓ of the depth of the groove. For example, the latter will be given a depth between 1.5 and 4 μm, whilst the metal layer has a thickness between 0.5 and 1 μm.

Figure 9:
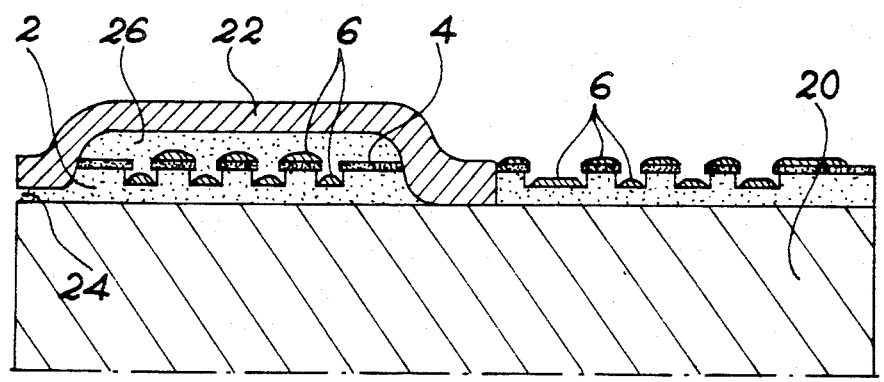
FIG. 9, in section, a magnetic recording head using the coil according to the invention.

FIG. 9 shows, in section, a magnetic head using the coil according to the invention. Support 2 is deposited on a solid or thin film-type magnetic material 20, which forms the first pole piece of the head. A second pole piece 22, which is also formed from solid or thin film-type magnetic material is electrically insulated from the coil conductors by an electrically insulating coating 26. At the front of the head, an air gap 24 separates the pieces 20 and 22, whilst at the rear the two pole pieces are joined, so as to close the magnetic circuit around the coil. In order to obtain a good magnetic efficiency of the head, it is important that the distance separating the air gap from the rear closing area of the two pole pieces is as short as possible. To the extent that it leads to adjacent conductors, the double spiral makes it possible to reduce said distance to a minimum, for a given conductor size. It would naturally be possible to stack insulated double spirals a number of times.

What is claimed is:

1. A process for producing a coil for a magnetic recording head, consisting of the steps of:

covering an insulating support with a thin insulating film, said film being selected from the group consisting of silica and silicon nitride; and etching the insulating film by photolithography in order to give said film the shape of a first spiral having a center and periphery, which said first spiral terminates at the center as a wider area defining a future inner contact area, and terminates on the periphery as an area defining a future outer contact element; and etching the support by using the spiral-shaped insulating film as a mask to form a groove in the shape of a second spiral, which said second spiral is interleaved and couplementary to the first spiral, said groove having a groove bottom and a depth; and depositing a thin metal layer simultaneously on the insulating film used as the mask and on the bottom of the etched groove, which gives rise to a first conductor on the insulating film and a second conductor on the groove bottom, which said first and second conductors are in the form of complementary spirals to each other, and are located in two different horizontal planes, each of said spirals terminating by an inner contact element and an outer contact element, the thin metal layer having a thickness of approximately ⅓ of the depth of the groove; and depositing a photosensitive resin completely over at least said spirals; and removing the resin outside said spirals; and removing, by etching, portions of the metal layer deposited on the insulating film outside said spirals; and removing the remaining resin; and making an electrical connection between the inner contact element of the first or second spiral and the outer contact element of the other first or second spiral.

2. A process according to claim 1, wherein overetching of the support takes place always using the insulating film as the mask, which has the effect of making each insulating film overhang each vertical wall defining the groove.

3. A process according to claim 1, wherein the groove is given a depth between 1.5 and 4 μm.

4. A process according to claim 3, wherein the metal film is given a thickness between 0.5 and 1 μm.

* * * * *